(12) United States Patent
Hankey et al.

(10) Patent No.: US 6,634,541 B1
(45) Date of Patent: Oct. 21, 2003

(54) METHOD OF MANUFACTURING METAL CONTAINERS

(76) Inventors: James D. Hankey, Rte. 1, Box 398, Mead, OK (US) 73449; Ray J. Hankey, 3017 Quail Ridge Cir., Durant, OK (US) 74701

( * ) Notice: Subject to any disclaimer, the term of this patent is extended or adjusted under 35 U.S.C. 154(b) by 0 days.

(21) Appl. No.: 09/815,353

(22) Filed: Mar. 22, 2001

(51) Int. Cl.$^7$ .................. B23K 9/235; B65D 88/00; B65D 8/18; H02G 3/08
(52) U.S. Cl. .................. 228/135; 228/171; 220/1.5; 220/3.94; 220/4.28
(58) Field of Search ................ 228/135, 171, 228/184, 185, 134, 137, 182; 220/1.5, 62, 617, 67, 3.94, 4.28

(56) References Cited

U.S. PATENT DOCUMENTS

| | | | |
|---|---|---|---|
| 119,151 A | | 9/1871 | Johnson |
| 383,175 A | * | 5/1888 | Gardner ..................... 156/217 |
| 3,627,973 A | | 12/1971 | Smith ..................... 219/125 R |
| 3,655,087 A | * | 4/1972 | Luisada ..................... 220/1.5 |
| 3,696,936 A | * | 10/1972 | Straccia et al. ............. 220/1.5 |
| 3,837,299 A | * | 9/1974 | McClellan ................... 109/56 |
| 4,041,748 A | | 8/1977 | Wittke ........................ 72/166 |
| 4,135,633 A | * | 1/1979 | Lockwood et al. ........ 220/3.94 |
| 4,232,916 A | * | 11/1980 | Correia ....................... 312/107 |
| 4,275,678 A | * | 6/1981 | Bludworth .................. 114/248 |
| 4,310,958 A | | 1/1982 | Balaud et al. ............... 29/26 A |
| 4,369,957 A | | 1/1983 | Williams .................... 269/41 |
| 4,578,562 A | | 3/1986 | Lindstrom et al. ....... 219/125.1 |
| 4,621,185 A | | 11/1986 | Brown ................. 219/124.34 |
| 4,662,532 A | * | 5/1987 | Anderson et al. ........... 220/1.5 |
| 4,805,592 A | * | 2/1989 | Enami .................... 126/273 R |
| 4,809,851 A | * | 3/1989 | Oestreich et al. .......... 206/599 |
| 4,844,280 A | * | 7/1989 | Purdy ........................ 220/62 |
| 4,851,639 A | | 7/1989 | Sugitani et al. ........ 219/124.34 |
| 4,854,461 A | * | 8/1989 | Daniel et al. .............. 220/4.01 |
| 4,881,726 A | | 11/1989 | Jolkovski .................... 269/41 |
| 4,933,531 A | | 6/1990 | Ichikawa et al. ......... 219/86.25 |
| 4,952,773 A | | 8/1990 | Orsos et al. ............ 219/124.34 |
| 5,040,161 A | * | 8/1991 | Jones et al. ............... 211/41.14 |
| 5,114,034 A | * | 5/1992 | Miller et al. .................. 220/62 |
| 5,274,213 A | | 12/1993 | Sartorio .................... 219/125.1 |
| 5,380,978 A | * | 1/1995 | Pryor .................... 219/121.64 |
| 5,505,323 A | * | 4/1996 | Naoki et al. ............... 220/4.28 |
| 5,505,365 A | * | 4/1996 | Olsen ........................ 228/102 |
| 5,816,425 A | * | 10/1998 | Keip et al. ................. 220/4.31 |
| 5,878,940 A | * | 3/1999 | Rosenbalm ................ 228/135 |
| 5,932,122 A | | 8/1999 | Hong ..................... 219/124.34 |
| 6,011,241 A | | 1/2000 | Rongo .................... 219/124.34 |
| 6,065,668 A | * | 5/2000 | Natali .................... 219/121.63 |
| 6,109,052 A | * | 8/2000 | Austin, Jr. ................... 220/1.5 |
| 6,110,086 A | * | 8/2000 | Moran, Jr. ................... 493/22 |
| 6,135,666 A | * | 10/2000 | Kelly et al. ................. 403/256 |
| 6,179,437 B1 | * | 1/2001 | Hardy et al. ................. 29/513 |
| 6,274,809 B1 | * | 8/2001 | Pudims et al. ................ 174/48 |
| 6,308,396 B1 | * | 10/2001 | Lewis et al. .................. 29/467 |
| 6,401,959 B1 | * | 6/2002 | Dreano ....................... 220/476 |

FOREIGN PATENT DOCUMENTS

EP            0526378 A1    *  2/1993

* cited by examiner

*Primary Examiner*—Tom Dunn
*Assistant Examiner*—L. Edmondson
(74) *Attorney, Agent, or Firm*—Paul H. Johnson; Gable & Gotwals

(57) ABSTRACT

A method of manufacturing a container formed of five rectangular metal panels including a bottom panel, opposed side panels and opposed end panels, each panel having peripheral edges there around, including the steps of forming spaced apart notches leaving interpositioned tab portions in peripheral edges of the panels, positioning the bottom panel horizontally, positioning the two side panels and two end panels vertically around the periphery edges of the bottom panel forming four vertical and four horizontal panel intersections with tab portions aligned with mating notches at each of the panel intersections and welding the four vertical and four horizontal panel intersections to physically interconnect the five panels to provide an open top rectangular container.

6 Claims, 4 Drawing Sheets

METHOD OF MANUFACTURING METAL CONTAINERS

REFERENCE TO PENDING APPLICATIONS

This application is not related to any pending United States or international patent application.

REFERENCE TO MICROFICHE APPENDIX

This application is not referenced in any Microfiche Appendix.

FIELD OF THE INVENTION

This invention relates to methods and apparatus for fabricating metal containers and particularly for fabricating relatively large metal containers formed of flat sheets of metal.

BACKGROUND OF THE INVENTION

In manufacturing metal containers such as those for use for commercial waste disposal, the convention method uses press-breaks that result in multiple handling of large partially formed sheets of steel. The presently used method is cumbersome in that it requires multiple handlings of relatively large steel plates. To form the dimensions of containers made in this conventional manner, substantial effort is required on the part of several workers working with two large formed sections that are brought together to form the four walls of a typical rectangular steel box. As a result of the size and shape of the open end rectangle thus produced often the dimensions are not exactly matched and the squareness of the resulting container is difficult to achieve.

For background information relating to the general subject matter of this invention reference may be had to the following previously issued United States patents:

| U.S. PAT. NO. | INVENTOR | TITLE |
| --- | --- | --- |
| 119,151 | Johnson | Improvement in Clamps for Making Picture Frames |
| 3,627,973 | Smith | Successive Automatic Deposition of Contiguous Weld Beads Upon Non-planar Surfaces |
| 4,041,748 | Wittke | Method and Apparatus for Fabricating Metal Container |
| 4,310,958 | Balaud et al. | Production-Line Automatic Machine |
| 4,369,957 | Williams | Device for Clamping and Aligning Plates to be Joined in Selected Angular Relationship |
| 4,578,562 | Lindström et al | Method and Control System for Controlling an Industrial Robot |
| 4,621,185 | Brown | Adaptive Welding Apparatus Having Fill Control Correction for Curvilinear Weld Grooves |
| 4,851,639 | Sugitani et al. | Apparatus for Automatically Welding Cylindrical Vessel |
| 4,881,726 | Jolkovski | Vise for Joining Frames |
| 4,933,531 | Ichikawa et al. | Pantograph Type Robot Arm |
| 4,952,773 | Orsos et al. | Automatic Arc-Welding Machine Operating with Rod Electrodes and a Preferred Application Thereof |
| 5,274,213 | Sartorio | Electric Welding Robot and a Method for Welding by Using the Robot |
| 5,932,122 | Hong | Process for Detecting the Initial Welding Point of a Welding Robot |
| 6,011,241 | Rongo | Method of Adjusting Weld Parameters to Compensate for Process Tolerances |

BRIEF SUMMARY OF THE INVENTION

This invention covers a method of manufacturing a container formed of five rectangular metal panels. The five panels include a bottom panel, opposed side panels and opposed end panels.

The first step in forming a container of such five panels is to form spaced apart notches leaving interposition tab portions in edges of the five metal panels. Typically, such alternate notches and tabs are formed on all four of the edges of the bottom panel and on at least three of the edges of the end and side panels. Depending upon the ultimate configuration of the container, such notches and tabs may or may not be formed on upper edges of the end and side panels.

The bottom panel is supported horizontally. The two side panels and two end panels are then vertically supported around the periphery of the bottom panel with the tab portions along the adjacent edges being aligned with mating notches. The assembly then results in four vertical and four horizontal panel intersections where the tab portions are meshed with notches in adjacent panels. The assembled panels are then welded to each other. Specifically, the bottom edges of the two side and two end panels are welded to the four peripheral edges of the bottom panel. Opposed vertical side edges of the side and end panels are welded to adjacent panel vertical edges.

In a preferred method of manufacturing containers each formed of five rectangular metal panels, the vertical side and end panels are assembled around a bottom panel in an assembly location, after the spaced apart notches and interspersed tab portions are formed on the edges of the five panels. After the assembly is completed, it is moved along a track to a weld station where the bottom edges of the side and end panels are welded to the bottom panel and the adjacent vertical edges of the side panels and end panels are welded to each other. The vertical panels are held in place utilizing hydraulically actuated clamps at each of the four vertical panel intersections to thereby insure accurate positioning of the panels with respect to each other and with respect to the bottom panel and to insure increased consistency of right angle relationships between the panels.

The welding step is preferably carried out using a robotic welder operating within the vertically supported side and end panels.

A better understanding of the invention will be obtained by reference to the following detailed description of the invention taken in conjunction with the attached drawings.

DESCRIPTION OF THE DRAWINGS

FIG. 4 shows the container with a horizontal bottom sheet (not seen) with opposed end panels and opposed side panels positioned with respect to each other.

DETAILED DESCRIPTION OF THE INVENTION

Figure 1:
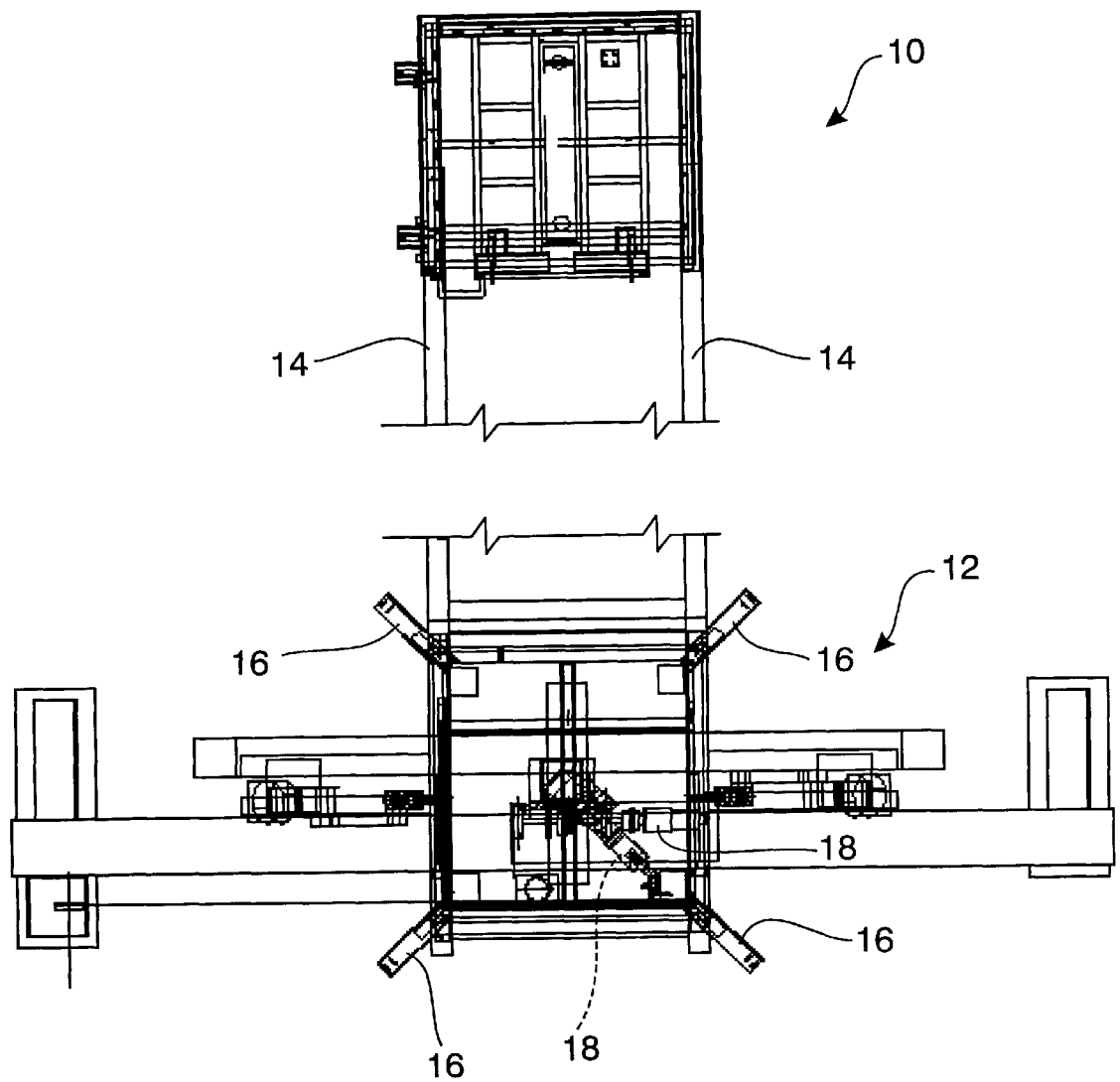
FIG. 1 is a lay-out plan of a metal container manufacturing system that employs the methods of this invention.

Referring first to FIG. 1, the layout of a system for manufacturing large metal containers is shown. The system includes two basic stations, the first being indicated by the numeral 10 indicating an assembly station and the second by the numeral 12 indicating a welding station. Metal containers are manufactured by first positioning a horizontal bottom panel and supporting to it opposed end panels and opposed side panels. Thus the basics of a large metal container are made of five flat panels, one horizontal and four vertical. These are arranged with respect to each other at station 10. The assembly is moved along a track 14 to the welding station 12 where the assembled panels are welded to each other to form the basic structure of a large metal container. At station 12, vertical side panels and end panels are supported to each other by means of hydraulically actuated clamps 16; four of clamps 16 being shown, one at each vertical corner of the metal container.

At the welding station 12, the vertical panels are welded to each other and to the bottom panel. One way of welding the panels is by the use of a robotic welder 18 shown in solid outline in one position and in dotted outline in another position.

Figure 2:
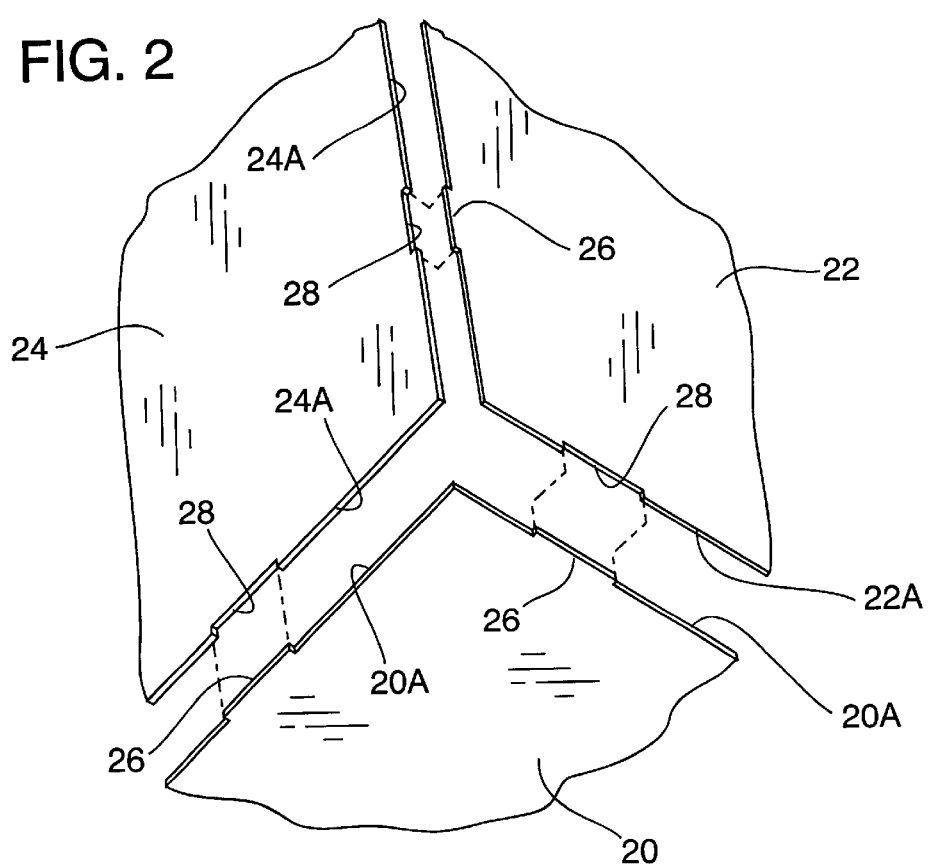
FIG. 2 is a fragmentary exploded view of three flat metal sheets that have notches and tabs formed on their peripheral edges.
Figure 3:
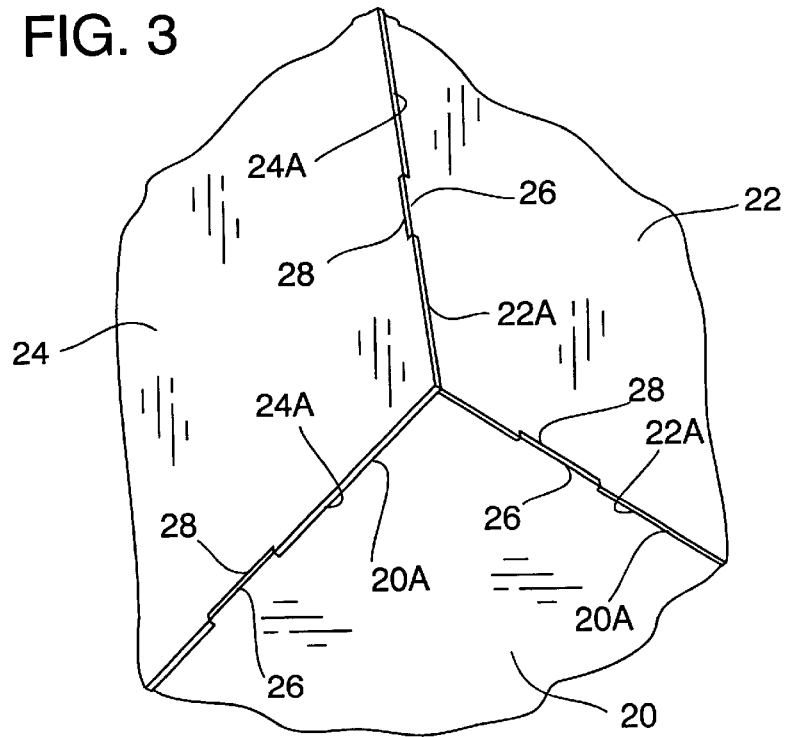
FIG. 3 shows the three flat metal sheets of FIG. 2 assembled together to form one corner of a metal container with the tabs and notches interlocked.

An important aspect of the present invention is a system that permits four vertical panels to be mounted with respect to a horizontal bottom panel and whereby the panels remain in alignment during the welding step. FIG. 2 shows a bottom panel 20, a first end panel 22 and a first side panel 24. The metal panels all have peripheral edges, the edges having integral extending tab portions 26 and/or mating notches 28. FIG. 3 shows the peripheral edges of the bottom panel mating with peripheral edges of the first end panel 22 and first side panel 24. The peripheral edges of bottom panel 20 are indicated by the numeral 20A; the peripheral edges of first end panel 22 are indicated by the numeral 22A and the peripheral edges of the first side panel 24 are indicated by 24A.

The tabs 26 and notches 28 provide a means of obtaining proper alignment of peripheral edges of the metal sheets (panels) used to manufacture large containers and aid in forming an assembly during the manufacturing process.

Figure 6:
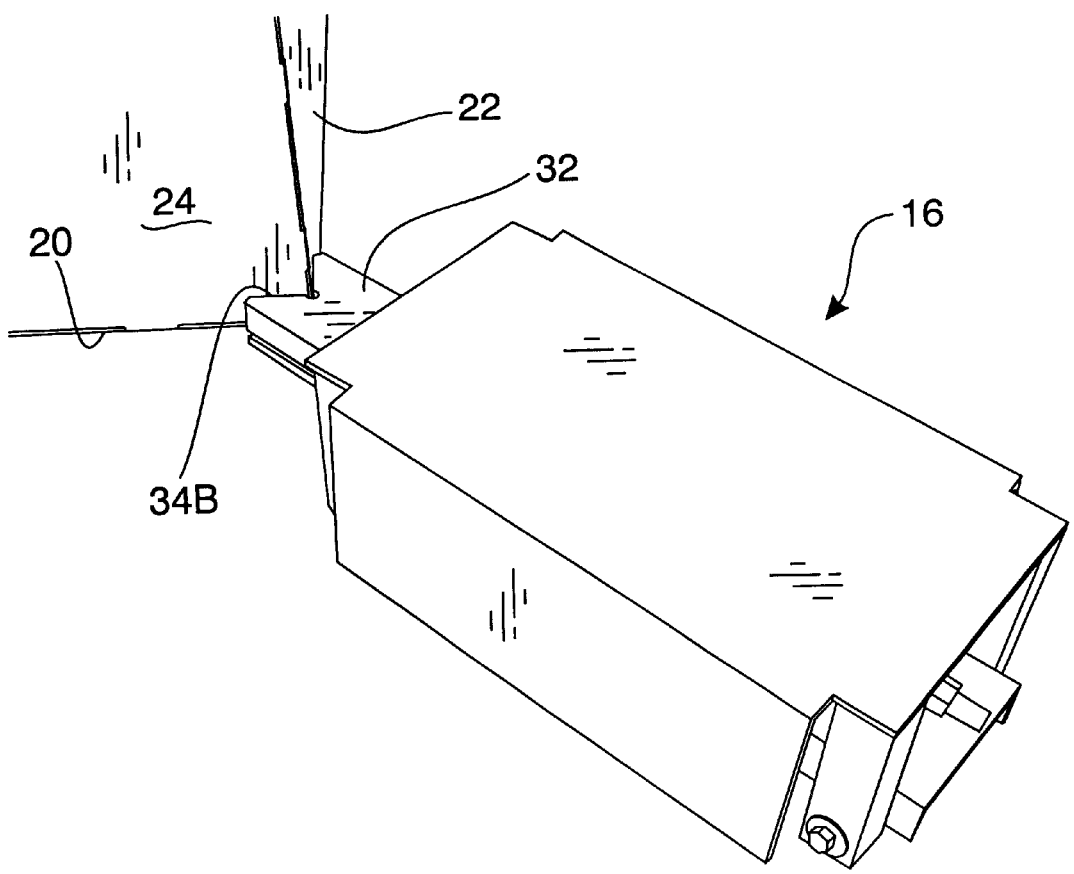
FIG. 6 is an enlarged isometric view of a lower corner of a metal container showing a hydraulically actuated positioning clamp used to retain an end panel and a side panel in position on a bottom panel during the assembly of a container.

After side and horizontal panels are assembled with respect to a bottom panel, they are held in position by means of hydraulically actuated positioning clamps 16 as seen in FIG. 6. In FIG. 6 the first end panel 22 and first side panel 24 are seen, however, the bottom panel is not seen due to the angle of the prospective. As previously stated, positioned adjacent to each of the vertical edges formed as a large metal container is assembled is a hydraulically actuated positioning clamp 16. Each hydraulic positioning clamp 16 has a hydraulic actuated cylinder (not seen but well known to those skilled in the art) that horizontally, inwardly and outwardly positions a clamp 32. Clamp 32 has on its outer end an angular face formed by legs 34A and 34B that extend at right angles to each other. In FIG. 6, leg 34A is in engagement with first end panel 22 and leg 34B is in engagement with first side panel 24.

Figure 4:
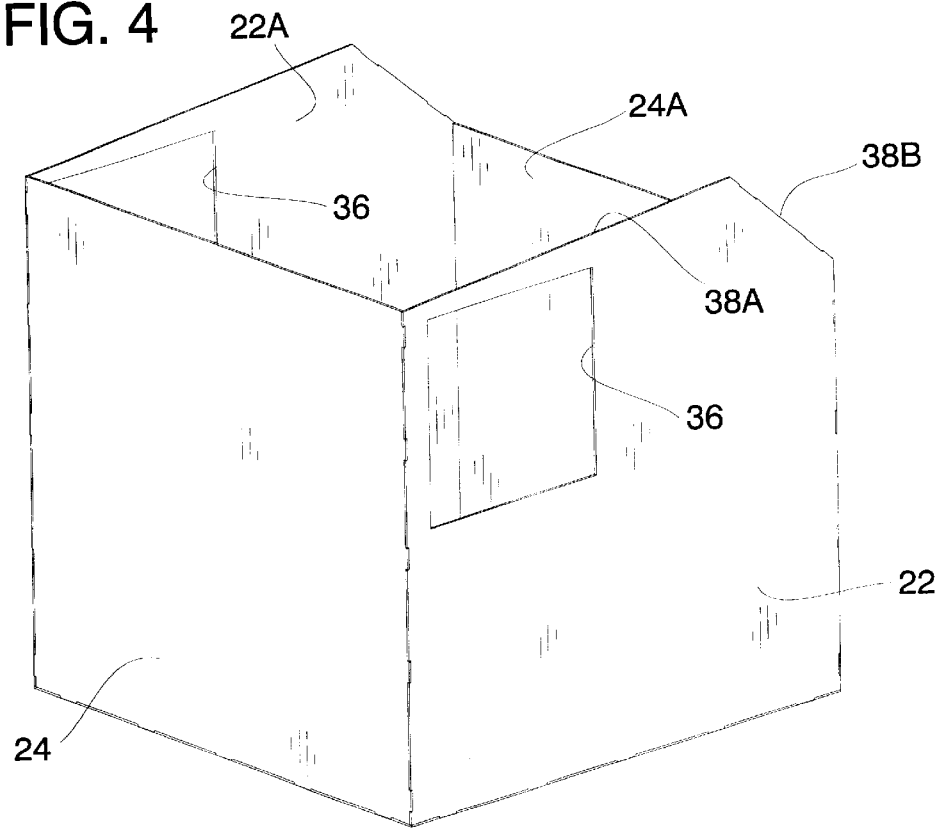
FIG. 4 is an isometric view showing the construction of a metal container.

FIG. 4 shows isometrically an assembly formed of five flat metal sheets one of which is a horizontal bottom panel that is not seen along with first end panel 22, opposed end panel 22A, first side panel 24 and the opposed side panel 24A. In the illustration, the end panels 22 and 22A are shown with windows 36 cut in them, illustrating that the actual configuration of the end panels and side panels can vary. Further, in FIG. 4 the top edge of first end panel 22 is formed of a first incline edge 38A and a second inclined edge 38B, the edges 38A and 38B extending at different angles relative to the horizontal. The particular configuration of the top edges of the end and side panels depend upon the ultimate desired configuration of the finished metal containers. In the illustrated arrangement, the metal containers shown in FIGS. 4 and 5 are typical of containers in the process of being manufactured that are used for storing trash or garbage.

Figure 5:
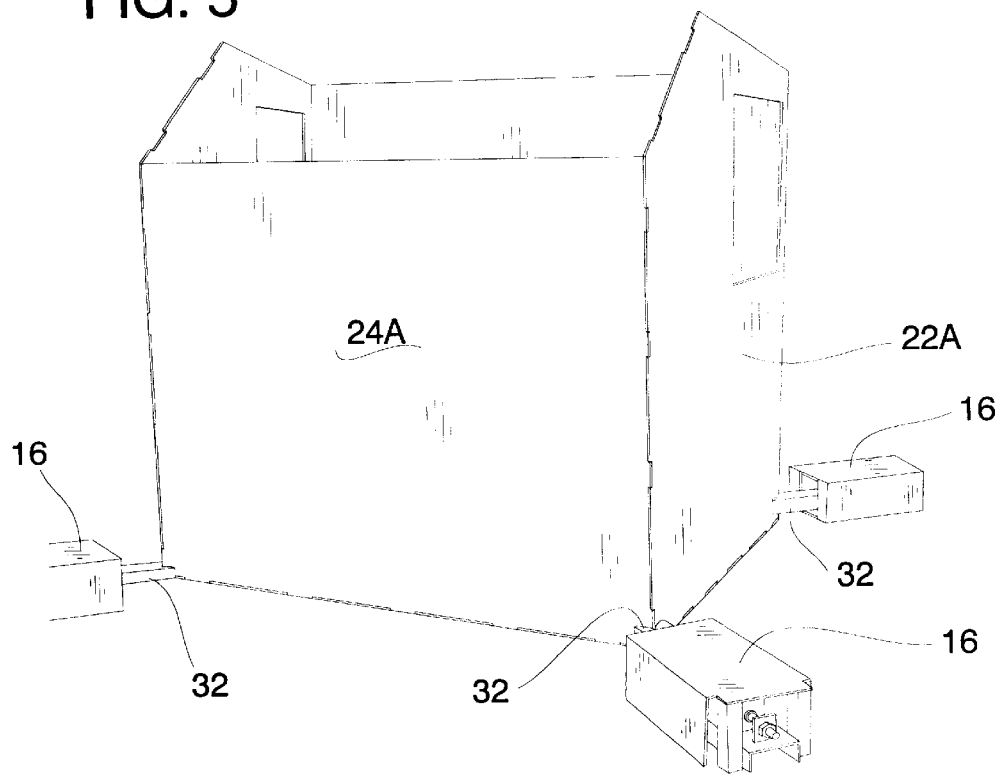
FIG. 5 is an isometric view taken from an opposite side of the perspective of FIG. 3 and shows hydraulically positioned angular clamps at opposed corners of the sidewalls. The positioning clamps are used to hold the sidewalls in place on the bottom panel during welding operation.

FIG. 5 shows an isometric view of the partially finished container of FIG. 4 from a prospective wherein the container is rotated 180°. FIG. 5 shows three of the usual four hydraulic positioning clamps 16 as used to maintain the end panels and side panels in position as interlocked by the spaced notches and tabs as has been described with respect to FIGS. 2 and 3.

As was stated in describing FIG. 1, the end panels, side panels and horizontal bottom panels are welded to each other utilizing a robotic welder 18. In the preferred arrangement, the robotic welder is positioned interior of the assembly so that the five basic panels making up a metal container are welded with four horizontal welds by which the bottom edges of these side and end panels are welded to the bottom panel and by four vertical welds by which the vertical edges of the side and bottom panels are welded to each other. The assembly could be manufactured by a robotic welder operating externally of the assembly but by welding internally of the structure, the provisions for hydraulically actuated clamp 16 are better accommodated.

After the base of structure is formed consisting of a horizontal bottom panel, two end panels and two side panels, the balance of the large metal container can be completed. If desired, reinforced structural elements may be welded to the outside of the end or side panels and in the usual instance, lids or covers are pivotally secured to the upper edges of the horizontal panels so that the container may be closed. Any other features desired of the completed large container can be added after the basic assembly is finished.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A method of manufacturing a container comprising:
   (1) forming spaced apart notches leaving integral interpositioned tab portions in peripheral edges of five planar, single thickness rectangular metal panels;
   (2) positioning a bottom panel horizontally;
   (3) positioning two side panels and two end panels vertically around said periphery edges of said bottom panel forming four vertical and four horizontal panel intersections with tab portions aligned with mating notches at each of the panel intersections;
   (4) actuating four translatable rams each having an angular face that simultaneously engages a pair of said vertical panels at the intersection thereof to hold said end and side panels in position around said bottom panel; and (5) welding said four vertical and four horizontal panel intersections to physically interconnect said five panels to provide an open top rectangular container.

2. A method of manufacturing a container according to claim 1 wherein step (5) is carried out with at least one robotic welder.

3. A method of manufacturing a container according to claim 2 wherein said robotic welder is operated at least in part inside said vertically positioned end and side panels.

4. A method of manufacturing containers comprising:

(1) forming spaced apart notches leaving interspaced integral tab portions in edges of five planar rectangular metal panels;

(2) at an assembly station, positioning a bottom panel horizontally and positioning two side panels and two end panels vertically around the periphery of said bottom panel forming four vertical panel intersections and four horizontal panel intersections with tab portions aligned with mating notch portions, thereby forming a container assembly;

(3) actuating four translatable rams each having an angular face that simultaneously engages a pair of said vertical panels at the intersection thereof to hold said end and side panels in position around said bottom panel;

(4) moving said container assembly retained by said rams on a track from said assembly station to a weld station; and (5) at said weld station, welding said four vertical and four horizontal panel intersections to physically interconnect said five panels to provide an open top container.

5. A method of manufacturing containers according to claim 4 wherein step (5) is carried out with at least one robotic welder.

6. A method of manufacturing containers according to claim 5 wherein said robotic welder is operated at least in part inside said vertically positioned end and side panels.

* * * * *